United States Patent [19]

Misselhorn

[11] 3,884,770

[45] May 20, 1975

[54] PROCESS FOR OBTAINING PURIFIED ALCOHOL FROM FERMENTED MASH

[76] Inventor: Klaus Misselhorn, Ascheberger Weg 41, Berlin 27, Germany

[22] Filed: Feb. 26, 1974

[21] Appl. No.: 446,110

Related U.S. Application Data

[63] Continuation of Ser. No. 185,653, Oct. 1, 1971, abandoned.

[30] Foreign Application Priority Data

Oct. 2, 1970   Germany............................ 2050212

[52] U.S. Cl. ....................... 203/82; 203/85; 203/84; 203/96; 426/192
[51] Int. Cl. ........................... B01d 3/16; B01d 3/38
[58] Field of Search ............. 203/81, 82, 83, 84, 85, 203/95–97, 71

[56] References Cited
UNITED STATES PATENTS

| | | | |
|---|---|---|---|
| 2,118,834 | 5/1938 | Boeckeler........................ | 426/494 X |
| 3,445,345 | 5/1969 | Katzen et al.......................... | 203/25 |

FOREIGN PATENTS OR APPLICATIONS 675,106   4/1939   Germany

Primary Examiner—Norman Yudkoff
Assistant Examiner—David Edwards
Attorney, Agent, or Firm—Wenderoth, Lind & Ponack

[57] ABSTRACT

A process for the preparation of purified alcohol from fermented mash wherein the steam employed for the dealcoholization of the mash is divided into two partial flows. One of the partial flows is a heat carrier for a preceding column system for the separation and concentration of the head first run products. The other of the partial flows goes to a subsequent rectifying column for conveying the material and for conveying heat. The substances containing the head first run products are removed directly from the mash by means of a degassing column which precedes the separating column. The steam discharged from the degassing column is concentrated in a further column with regard to its head first run product components.

1 Claim, 1 Drawing Figure

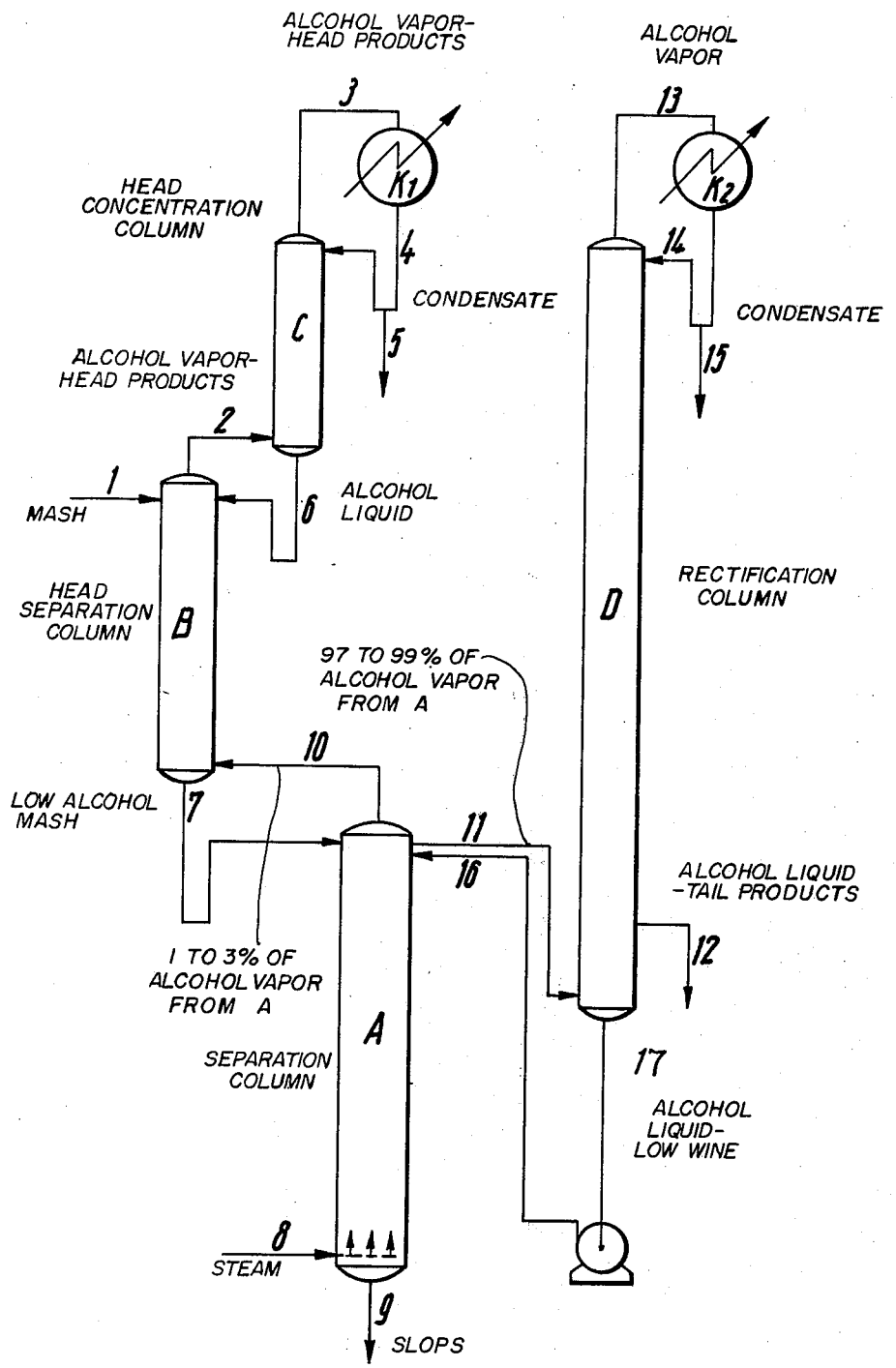

_3,884,770_

PROCESS FOR OBTAINING PURIFIED ALCOHOL FROM FERMENTED MASH

This is a continuation of application Ser. No. 185,653, filed Oct. 1, 1971, now abandoned.

BACKGROUND OF THE INVENTION

The invention relates to a process for the continuous manufacture of purified alcohol from fermented mash. In contrast with the known processes, the steam employed by the process of the invention for the dealcoholization or stripping of alcohol is used both for the rectification and also for the removal of the head first run products. The process of the invention is suitable in particular to the preparation of the distillates for the so-called genuine spirits, such as grain spirits, whisky, cognac, brandy, rum, etc., that are purified in part to a high extent and in part to a lesser extent and possess a peculiar aroma typical for the raw material employed.

Ordinarily, alcohol of this kind is prepared on periodically-operating bubbling apparatus, bubbling columns or on continuously operating apparatus. An object of the invention is to perform the distillation in a continuous manner wherein a system of columns is arranged in such a manner that the resulting consumption of steam (heating medium) and water (cooling medium) amounts to about 50% of the quantity usually required until the present time. This will be explained on an example for the preparation of grain distillate.

Until the present time the fine grain distillate was prepared in accordance with two variants of the process:

a. In a first step, a crude distillate with 60 – 90 percent by volume alcohol content is produced in a continuous manner. After a dilution to 40% by volume, the crude distillate is rectified periodically in a second step to 96% by volume. During such a second step, the separation of undesirable impurities, such as acetaldehyde, certain esters, volatile fatty acids and higher alcohols (that are combined under the term "fusel oil"), is carried out.

b. The crude distillate is produced in the first step as described under a). In the second step, the rectification is carried out in a continuous manner in a multiple column arrangement consisting of two or three columns. Also here the undesirable impurities are not separated prior to the second step.

SUMMARY OF THE INVENTION

According to the invention, (c) the fine distillate of grain is prepared in a continuous manner in a single step directly from the mash. The undesirable components are separated for the most part from the mash and not from an intermediate product designated as crude distillate.

The advantage of the new process can be seen from the following table.

|   | Steam kg/hl pure alcohol | Water m³/hl pure alcohol | yield % fine distillate |
|---|---|---|---|
| a | 500 – 600 | 4.5 – 5.5 | 60 – 85 |
| b | 480 – 550 | 4.5 – 5.0 | 95 – 98 |
| c | 250 – 300 | 1.5 – 2.0 | 97 – 98 |

With a high yield, the process of the invention results in a steam consumption which is approximately 50 percent of the amount required until the present time and a water consumption which is approximately 30 – 40 percent of the amount required until the present time.

BRIEF DESCRIPTION OF THE DRAWING

The above and other objects will become apparent from the following detailed description taken with the drawing, in which:

The FIGURE is a diagrammatic illustration of a preferred embodiment of a system for carrying out the invention.

DETAILED DESCRIPTION OF THE INVENTION

The mash flows through a line 1 to a column B where it is freed of the dissolved gases in a known manner. At the same time, the substances possessing the head products first running features are transported by the ascending steam through pipe 2 toward column C. Here a concentration takes place so that the steam enters a condenser $K_1$ through a pipe 3 and possesses a substantially greater concentration of head (first running) products than the steam supplied to column C through pipe 2.

The condensate flows through pipe 4 to the top of column C. A portion of the condensate is removed from the circulation through pipe 5. The condensate flowing downward in column C passes through pipe 6 to the top of column B and, combined with the mash, it flows to the foot of this column and through pipe 7 to the top of a separating or stripping column A. Here, the alcohol is removed from the mash in a known manner through steam supplied at the foot by pipe 8, and the slops free of alcohol flow off through pipe 9.

At the head of column A, the steam is so divided according to the invention that only approximately 1 – 3 percent of the alcohol amount carried through the apparatus is supplied by pipe 10 to columns B and C while 97 – 99 percent of the alcohol amount flows to column D over pipe 11. The rectification to the high alcohol strength takes place here in association with the separation of the higher alcohols through pipe 12. The steam discharged at the top of column D flows through pipe 13 to a condenser $K_2$. The condensate is returned as a return flow (reflux) through pipe 14 to column D. The distillate may be removed through pipe 15. An alcohol-containing low wine is obtained at the foot of column D, through pipe 17, which is led by means of a pump 18 and pipe line 16 to separating column A to remove the alcohol in column A. The columns may be constructed in a known manner as plate-type columns or as packed columns.

An industrial plant installation constructed in accordance with the invention produced a fine distillate of grain exhibiting a fine and typical grain aroma insofar as the sensory effect is concerned and with the following analysis:

| Aldehyde | < 4 mg/l pure alcohol |
|---|---|
| fusel oil | > 4 mg/l pure alcohol |
| esters | 20 mg/l pure alcohol |
| acids | 0 |
| pH value | 6.9 |

I claim:

1. A process for the preparation of purified alcohol from fermented mash, said purified alcohol having therein typical aroma imparting ingredients of the mash thereof, said process comprising:

passing said mash into a degassing column;
degassing said mash in said degassing column;
passing the head products containing vapor from said degassing column to a concentration column to obtain a head products concentrate including aroma imparting ingredients of said mash;
returning all of said concentrate to said degassing column to join the degassed mash;
passing said degassed mash and concentrate into a separation column;
separating the alcohol from said mash and concentrate in said separation column and forming an alcohol containing vapor stream;
dividing said vapor stream into a first partial stream and a second partial stream in such a way that 1 to 3 percent of the alcohol in said mash is contained in said first partial stream and 97 to 99 percent of the alcohol in said mash is contained in said second partial stream;
passing said first partial stream into said degassing column as a heat source;
passing said second partial stream into a rectification column and distilling therein said second partial stream; and
removing the resultant distilled and purified alcohol, whereby typical aroma imparting ingredients of the raw material used for said mash are retained in said purified alcohol.

* * * * *